United States Patent [19]

Engdahl

[11] Patent Number: 5,753,917
[45] Date of Patent: May 19, 1998

[54] DUAL CRYSTAL SCINTILLATION CAMERA

[76] Inventor: John C. Engdahl, 2929 The Concord Court, Ellicott City, Md. 21042

[21] Appl. No.: 470,428

[22] Filed: Jun. 6, 1995

[51] Int. Cl.⁶ .......................... G01T 1/164; G01T 1/202
[52] U.S. Cl. ...................... 250/367; 250/363.02
[58] Field of Search ................ 250/367, 363.02, 250/486.1; 378/5

[56] References Cited

U.S. PATENT DOCUMENTS

| | | | |
|---|---|---|---|
| 4,037,105 | 7/1977 | Laurer | 250/367 |
| 4,247,774 | 1/1981 | Brooks | 250/367 |
| 4,864,594 | 9/1989 | Inbar et al. | 378/5 |
| 4,879,465 | 11/1989 | Persyk et al. | 250/367 |

OTHER PUBLICATIONS

Manchanda, R.K., et al., *Imaging phoswich Anger camera*, Indian Journal of Radio and Space Physics, vol. 20, Jun. and Aug. 1991, pp. 268–271.

*Primary Examiner*—Carolyn E. Fields
*Attorney, Agent, or Firm*—Rothwell, Figg, Ernst & Kurz

[57] ABSTRACT

A scintillation camera is provided with a scintillation crystal assembly having multiple crystal layers for interacting with various photon energy levels. The camera performs imaging of conventional nuclear medicine radioisotopes as well imaging of high energy isotopes used in PET (Positron Emission Tomography) applications. The multiple crystal layers have the effect of doubling the sensitivity of the camera to high energy photons, while retaining the performance characteristics needed for conventional low energy photon imaging.

14 Claims, 2 Drawing Sheets

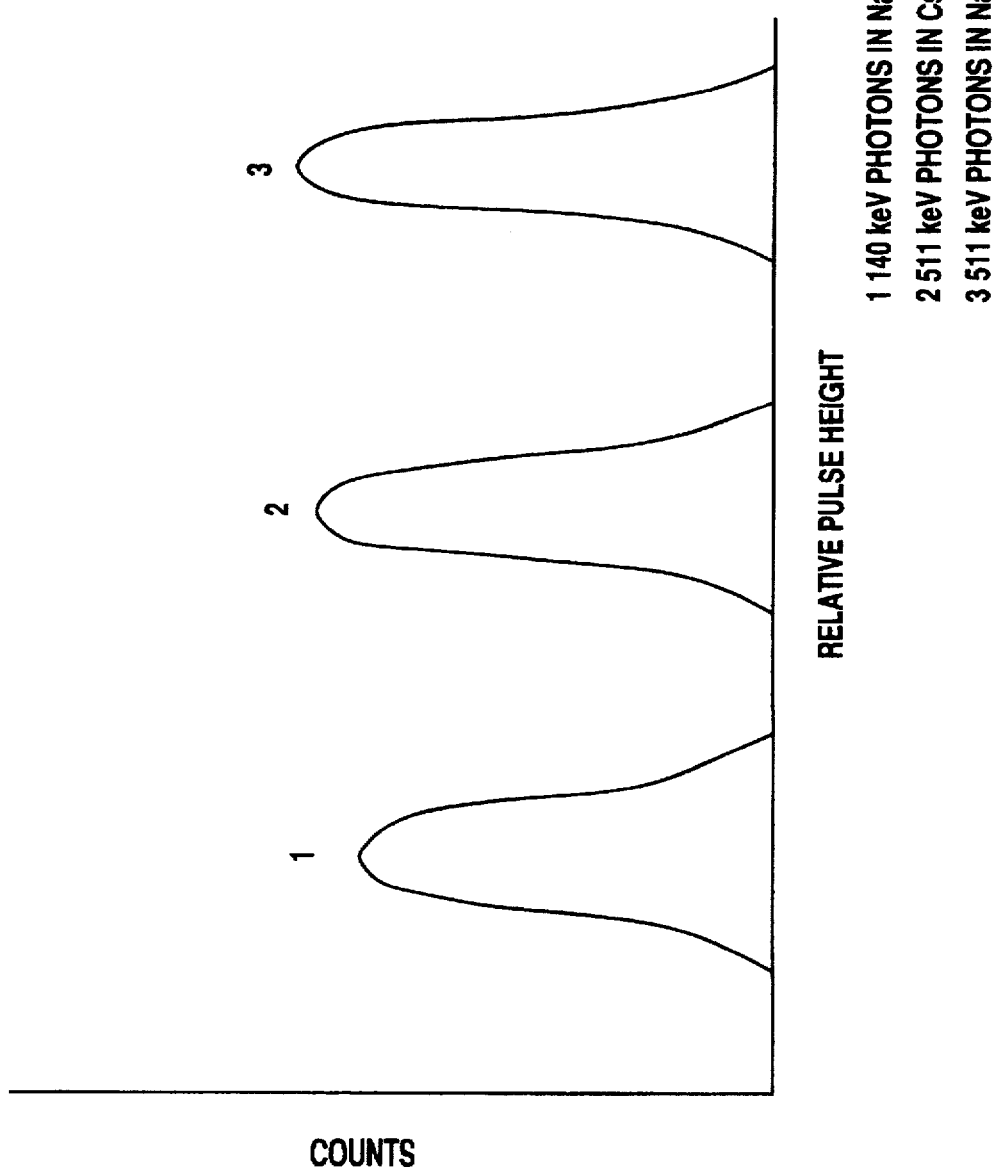

DUAL CRYSTAL SCINTILLATION CAMERA

BACKGROUND OF THE INVENTION

1. Field of the Invention

The present invention relates generally to imaging devices for nuclear medicine, and more specifically relates to gamma ray or scintillation cameras and methods of obtaining images with a single camera from both high energy and low energy radioisotope distribution fields.

2. Background and Prior Art

In nuclear imaging, a patient is injected with or swallows a radioactive isotope which has an affinity for a particular organ. Gamma rays are then emitted from the organ of interest, and are detected by a gamma ray or scintillation camera device which forms an image of the organ based on the concentration and distribution of the radioactive isotope within the organ.

The scintillation camera as utilized in nuclear medicine is a well known device. The original scintillation camera or "Anger camera" (named after the inventor) is described in U.S. Pat. No. 3,011,057. The Anger camera uses a scintillation crystal, such as a NaI crystal, which absorbs incident gamma rays from the object under study and interacts with the gamma ray to produce light events. An array of photomultiplier tubes is placed adjacent to the crystal in order to detect and amplify these light events so as calculate the spatial location and energy level of the incident gamma ray to produce a two dimensional image of the object which then may be displayed on a CRT or printed as a hard copy.

For each incident gamma ray which interacts with the crystal, the electronic circuitry of the camera combines the output of the photomultiplier tubes and individually computes the spatial (x,y) coordinates and the energy signal (z) for the detected radiation event. An image is generated by plotting the x,y position of a large number (typically millions) of such events. Since cosmic gamma rays and scattered gamma rays will be incident on the detector in addition to the unscattered gamma rays emitted from the radioactive isotope within the organ of interest, the energy signal z is used to identify certain detected gamma rays as being desired for contribution to the image, from among all gamma rays which are incident on the detector. The energy signal z has a functional relationship to the total energy of an incident gamma ray and thus incoming gamma rays are discriminated on the basis of the amplitude of this energy signal.

The radioisotope of most common usage in nuclear medicine is typically $^{99m}$Tc which emits a gamma ray of 140 keV. A NaI(Tl) scintillation crystal exhibits ideal characteristics for absorbing incident gamma rays of 140 keV and interacting with the 140 keV gamma ray to produce light events.

Recently, there has been a growing interest in the use of FDG ($^{18}$F-deoxyglucose) as a radiopharmaceutical for certain imaging applications, such as tumor necrosis following chemo- or radiation therapy, cardiac imaging, and oncological imaging in general. $^{18}$F decay results in positron emission photons of 511 keV. The conventional Anger camera, however, is not well suited for detecting 511 keV photons. Among other factors, the NaI(Tl) scintillation crystal of the Anger camera is very inefficient for absorption of 511 keV photons, as they are of much higher energy than the 140 keV photon imaging for which the Anger camera is optimized.

For example, a typical NaI(Tl) crystal is 10 mm thick followed by a 12 mm thick glass plate. The probability per pathlength for photoelectric absorption of a 511 keV photon in such a crystal is computed as follows:

$$mu\ PE(511\ keV) = 0.0177\ (cm^2/g) \times 3.667\ (g/cm^3) = 0.065\ cm^{-1}$$

The probability that a normally incident approximately 511 keV photon interacts in the 10 mm thickness of NaI crystal is then calculated:

$$Interaction\ probability = 1 - Exp[-0.065\ cm^{-1} \times 1.0\ cm] = 6.3\%.$$

The probability that the photon will undergo Compton scattering in the crystal is much higher:

$$mu\ Compton\ (511\ keV) = 0.0744\ cm^2/g) \times 3.667\ (g/cm^3) = 0.273\ cm^{-1}$$

This means that only 6.5% of the 511 keV photons normally incident on the NaI(Tl) crystal will produce a full energy peak absorption. 29% of the incident photons will interact by either absorption or scattering. However, only a fraction of the scattering photons will produce a measurable event for which an accurate position can be computed. Such results have made the Anger camera unsuitable for performing 511 keV imaging.

Therefore, in order to perform 511 keV imaging, it has been heretofore necessary to use a much more expensive PET (Positron Emission Tomography) system which is based on detecting coincidence of two absorbed photons, which cannot be used for conventional 140 keV imaging applications. The practitioner wishing to perform 511 keV imaging as well as the more conventional 140 keV imaging thus was required to purchase and maintain two expensive systems.

There thus exists a need in the art for a scintillation camera which is capable of satisfactorily performing not only imaging of 140 keV distribution fields, but which can also feasibly perform 511 keV imaging.

SUMMARY OF THE INVENTION

The present invention overcomes the disadvantages discussed above by providing a scintillation camera which is capable of performing conventional nuclear imaging of low energy isotopes, such as $^{99}$mTc, as well as being able to image high energy isotopes such as $^{18}$F, with significantly better sensitivity.

In particular, the present invention provides a scintillation camera capable of imaging both relatively low energy photons and imaging of relatively high energy photons emitted from a radiation field, comprising a first scintillation crystal layer for interacting with low energy photons as well as high energy photons, a second scintillation crystal layer formed adjacent to said first scintillation crystal layer for primarily interacting with only high energy photons, and detection circuitry for detecting scintillation events from said first scintillation crystal layer during imaging of said relatively low energy photons, and for detecting scintillation events from both said first scintillation crystal layer and said second scintillation crystal layer during imaging of said relatively high energy photons.

BRIEF DESCRIPTION OF THE DRAWINGS

The present invention will become more fully understood from the detailed description given hereinbelow and the accompanying drawings, which are given by way of illustration only and which are not limitative of the present invention, and wherein:

FIG. 2 is a graph of the energy spectrum of various photons absorbed in the different crystals of the scintillation camera according to the present invention.

DETAILED DESCRIPTION OF THE PREFERRED EMBODIMENTS

Figure 1:
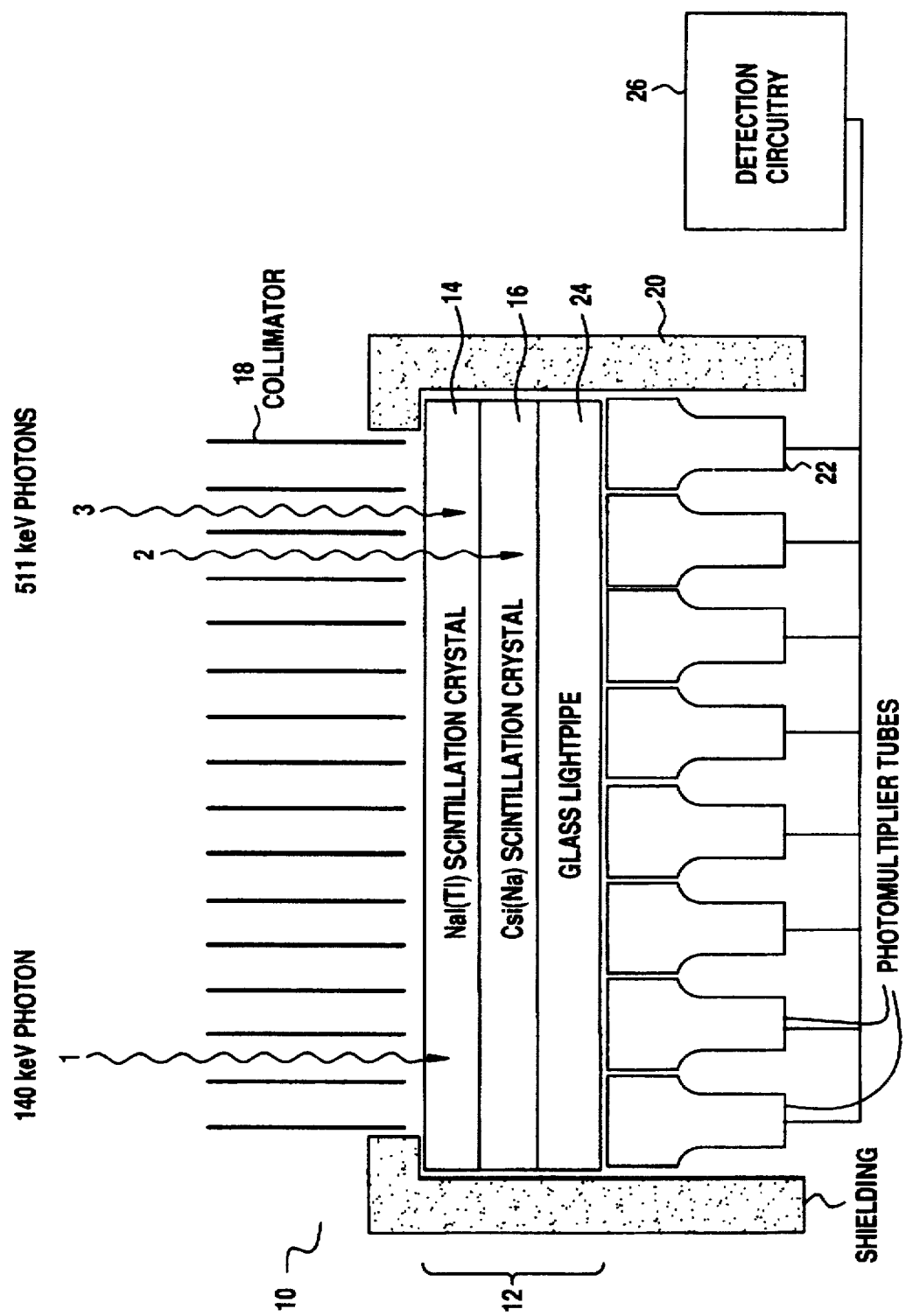
FIG. 1 is a cross-sectional diagram of a scintillation camera according to one preferred embodiment of the present invention.

The present invention provides a dual purpose scintillation camera having a scintillation crystal composed of two layers. When performing conventional nuclear imaging of low energy radioisotopes, only the first of the two layers is utilized for detection. However, in the performance of high energy photon imaging (such as 511 keV imaging), the combined thickness of both layers is utilized to effectively double the sensitivity of the camera.

As shown in FIG. 1, the imaging camera 10 according to one embodiment of the present invention contains a scintillation crystal 12 having a first layer 14 composed of NaI(Tl) and a second layer 16 composed of CsI(Na). The scintillation camera further includes a collimator 18 for collimating photons incident on the crystal, a lead shielding device 20, an array of photomultiplier tubes 22 for detecting and localizing scintillation events within the crystal, and a glass lightpipe 24 on which the photomultiplier tubes are mounted. Additionally, detection circuitry 26 is included for detecting, discriminating, localizing and counting scintillation events in the crystal assembly 12.

Such a crystal assembly is sometimes referred to as a "phoswich" crystal, from "phosphorescence sandwich." Such a phoswich crystal has been known per se, but has been used in significantly different applications.

As one example for purposes of illustration, the first layer 14 of NaI(Tl) has a thickness of 7 mm, the second layer 16 of CsI(Na) has a thickness of 10 mm, and the lightpipe 24 has a thickness of 5 mm. The probability for absorbing 511 keV photons is computed as:

$$mu\ PE\ (511\ keV) = 0.021\ (cm^2/g) \times 4.51\ (g/cm^3) = 0.095\ cm^{-1}$$

and the probability of photon scatter in the crystal is computed as:

$$mu\ Compton\ (511\ keV) = 0.072\ (cm^2/g) \times 4.51\ (g/cm^3) = 0.32\ cm^{-1}$$

Assuming that all scattered photons are counted as well as full energy peak absorptions, a sensitivity of roughly 65% is achieved. Because the combined crystal thickness is double the thickness of NaI alone (and approximately double the thickness of the conventional scintillation camera) a sensitivity increase by a factor of 2 is realized over a conventional NaI(Tl) crystal.

In the performance of conventional nuclear imaging of a low energy isotope such as $^{99m}$Tc (photon 1 in FIG. 1), the NaI(Tl) crystal exhibits the same behavior as a conventional ¼" crystal, with almost all of the 140 keV photons being stopped in the NaI crystal. This is shown by the pulse 1 in the graph of FIG. 2. Some of the photons will pass through the NaI crystal and be stopped in the CsI crystal, producing a scintillation event; however, the decay constant of the CsI crystal is much longer as compared with that of the NaI crystal (600 ns vs. 230 ns). Thus, setting an integration time of the system for NaI will cause those events in the CsI crystal to fall outside the energy window discrimination.

When imaging 511 keV photons, some of them (3 in FIG. 1) will be stopped by the NaI crystal, and more (2 in FIG. 1) will be stopped by the CsI crystal. The two corresponding energy pulses are shown in FIG. 2. Thus, the energy discrimination can be modified to make the energy window very wide to accept events from both the NaI crystal and the CsI crystal, thereby doubling the sensitivity. Because most of the events are scattered in the crystal, the difference between integrated signals from the two layers does not matter.

Alternatively, the high energy events could be selected by using two energy windows, corresponding to the output signals from each of the NaI(Tl) and CsI(Na) crystal layers. Additionally, while the second layer according to the invention has been specified as CsI(Na), other compositions could be used having a similar effect, such as CsI(Tl). Moreover, while the preferred embodiment includes first and second scintillation crystal layers formed adjacent to one another, the present invention is not limited to such a construction but may also encompass other crystal structures having separate portions for conventional nuclear imaging and for high energy photon imaging applications.

Another alternative embodiment would be to employ a system with two gamma cameras, in 1800 configuration, without collimators. In this configuration, the system could be used to detect positron sources by the coincident detection of both 511 keV gamma-rays emitted in the annihilation of the positron. In this embodiment, the improved sensitivity of the present invention would be even more significant to improving the performance over the conventional gamma camera. For coincident detection, the probability of detection is the square of the probability of detecting a 511 keV photon in a single detector, because two simultaneous detections in opposing detectors are required to record an event. Since the present invention approximately doubles the sensitivity of detecting a single 511 keV photon in a single detector, utilizing the invention for two cameras configured for coincident detection would approximately quadruple the sensitivity.

The invention having been thus described, it will be apparent to those skilled in the art that the same may be varied in many ways without departing from the spirit and scope of the invention. Any and all such modifications are intended to be included within the scope of the following claims.

What is claimed is:

1. A scintillation camera for performing imaging of relatively low energy photons and imaging of relatively high energy photons emitted from a radiation field, comprising:
   a first scintillation crystal layer for interacting with low energy photons as well as high energy photons;
   a second scintillation crystal layer positioned adjacent to said first scintillation crystal layer for primarily interacting with only high energy photons; and
   an array of detector means positioned adjacent said first and second scintillation crystal layers opposite said radiation field for detecting the location of scintillation events occurring in said first scintillation crystal layer during imaging of said relatively low energy photons, and for detecting the location of scintillation events occurring in both said first scintillation crystal layer and said second scintillation crystal layer during imaging of said relatively high energy photons.

2. A scintillation camera according to claim 1, wherein said first scintillation crystal layer is formed of NaI(Tl).

3. A scintillation camera according to claim 1, wherein said second scintillation crystal layer is formed of CsI(Na).

4. A scintillation camera according to claim 1, wherein said second scintillation crystal layer is formed of CsI(Tl).

5. A scintillation camera according to claim 1, wherein said relatively low energy photons are photons of 140 keV.

6. A scintillation camera according to claim 1, wherein said relatively high energy photons are photons of 511 keV.

7. A scintillation camera according to claim 1, wherein said array of detector means comprises an array of photomultiplier tubes.

8. A scintillation camera for performing imaging of relatively low energy photons and imaging of relatively high energy photons emitted from a radiation field, comprising:

a scintillation crystal assembly for interacting with low energy photons as well as high energy photons, including a first portion which interacts both with said low energy photons and said high energy photons, and a second portion which interacts primarily with only high energy photons; and an array of detector means positioned adjacent said scintillation crystal assembly for detecting the location of scintillation events occurring in said first portion during imaging of said relatively low energy photons, and for detecting the location of scintillation events occurring in both said first and said second portions during imaging of said relatively high energy photons.

9. A scintillation camera according to claim 8, wherein said first portion is formed of NaI(Tl).

10. A scintillation camera according to claim 8, wherein said second portion is formed of CsI(Na).

11. A scintillation camera according to claim 8, wherein said second portion is formed of CsI(Tl).

12. A scintillation camera according to claim 8, wherein said relatively low energy photons are photons of 140 keV.

13. A scintillation camera according to claim 8, wherein said relatively high energy photons are photons of 511 keV.

14. A scintillation camera according to claim 8, wherein said array of detector means comprises an array of photomultiplier tubes.

* * * * *